(12) United States Patent
Lopitaux

(10) Patent No.: US 8,637,597 B2
(45) Date of Patent: Jan. 28, 2014

(54) RUBBER TYRE COMPOSITION CONTAINING A DIESTER PLASTICIZER

(75) Inventor: Garance Lopitaux, Valignat (FR)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 776 days.

(21) Appl. No.: 12/599,920

(22) PCT Filed: May 13, 2008

(86) PCT No.: PCT/EP2008/003809
§ 371 (c)(1),
(2), (4) Date: Mar. 4, 2010

(87) PCT Pub. No.: WO2008/141749
PCT Pub. Date: Nov. 27, 2008

(65) Prior Publication Data
US 2010/0256275 A1    Oct. 7, 2010

(51) Int. Cl.
*C08K 5/00* (2006.01)
*C08K 5/11* (2006.01)
*H01B 3/30* (2006.01)

(52) U.S. Cl.
USPC .......................................... 524/285; 524/314

(58) Field of Classification Search
USPC ................................................ 524/285, 314
See application file for complete search history.

(56) References Cited

U.S. PATENT DOCUMENTS

| | | | |
|---|---|---|---|
| 5,977,238 A | 11/1999 | Labauze | |
| 6,013,718 A | 1/2000 | Cabioch et al. | |
| 6,405,775 B1 | 6/2002 | Maly et al. | |
| 6,503,973 B2 | 1/2003 | Robert et al. | |
| 6,774,255 B1 | 8/2004 | Tardivat et al. | |
| 6,815,473 B2 | 11/2004 | Robert et al. | |
| 7,138,450 B2* | 11/2006 | Wentworth et al. | 524/284 |
| 2004/0051210 A1 | 3/2004 | Tardivat et al. | |
| 2004/0122134 A1* | 6/2004 | Weydert et al. | 524/47 |
| 2004/0132880 A1 | 7/2004 | Durel et al. | |
| 2005/0016650 A1 | 1/2005 | Durel et al. | |
| 2005/0016651 A1 | 1/2005 | Durel et al. | |
| 2005/0148713 A1 | 7/2005 | Labauze et al. | |
| 2006/0089445 A1 | 4/2006 | Gandon-Pain | |
| 2008/0156404 A1 | 7/2008 | Brunelet et al. | |
| 2008/0188601 A1 | 8/2008 | Grass et al. | |

FOREIGN PATENT DOCUMENTS

| | | |
|---|---|---|
| DE | 10 2005 028 752 A1 | 1/2007 |
| EP | 1 127 909 A1 | 8/2001 |
| EP | 1 820 667 A | 8/2007 |
| FR | 2 740 778 A1 | 5/1997 |
| FR | 2 765 882 A1 | 1/1999 |
| FR | 2 866 028 A1 | 8/2005 |
| JP | 7-011074 A | 1/1995 |
| WO | WO 97/36724 A2 | 10/1997 |
| WO | WO 99/16600 A1 | 4/1999 |
| WO | WO 01/92402 A1 | 12/2001 |
| WO | WO 02/30939 A1 | 4/2002 |
| WO | WO 02/31041 A1 | 4/2002 |
| WO | WO 02/083782 A1 | 10/2002 |
| WO | WO 03/002648 A1 | 1/2003 |
| WO | WO 03/002649 A1 | 1/2003 |
| WO | WO 2004/022644 A1 | 3/2004 |
| WO | WO 2004/096865 A2 | 11/2004 |
| WO | WO 2005/087859 A1 | 9/2005 |
| WO | WO 2006/061064 A1 | 6/2006 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/017060 A1 | 2/2007 |

OTHER PUBLICATIONS

English machine translation of JP 07-011074.*
International Search Report of Application No. PCT/EP2008/003809 dated Jul. 28, 2008.

* cited by examiner

*Primary Examiner* — Angela C Scott
(74) *Attorney, Agent, or Firm* — Dickinson Wright PLLC

(57) ABSTRACT

Rubber composition comprising at least one diene elastomer, one reinforcing filler and one 1,2-cyclohexanedicarboxylate diester plasticizer corresponding to the formula (R hydrocarbon radical):

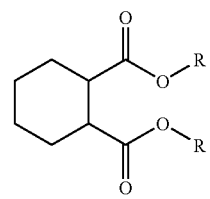

The invention also relates to the use of such a composition in the manufacture of a tire or of a tire semi-finished product made of rubber, in particular of a tire tread exhibiting an improved wet grip, without adversely affecting its other properties; it also relates to the tires and semi-finished products themselves and to a plasticizing system comprising, in combination, the said diester plasticizer and a plasticizing hydrocarbon resin, the glass transition temperature (Tg) of which is greater than 0° C.

32 Claims, 1 Drawing Sheet

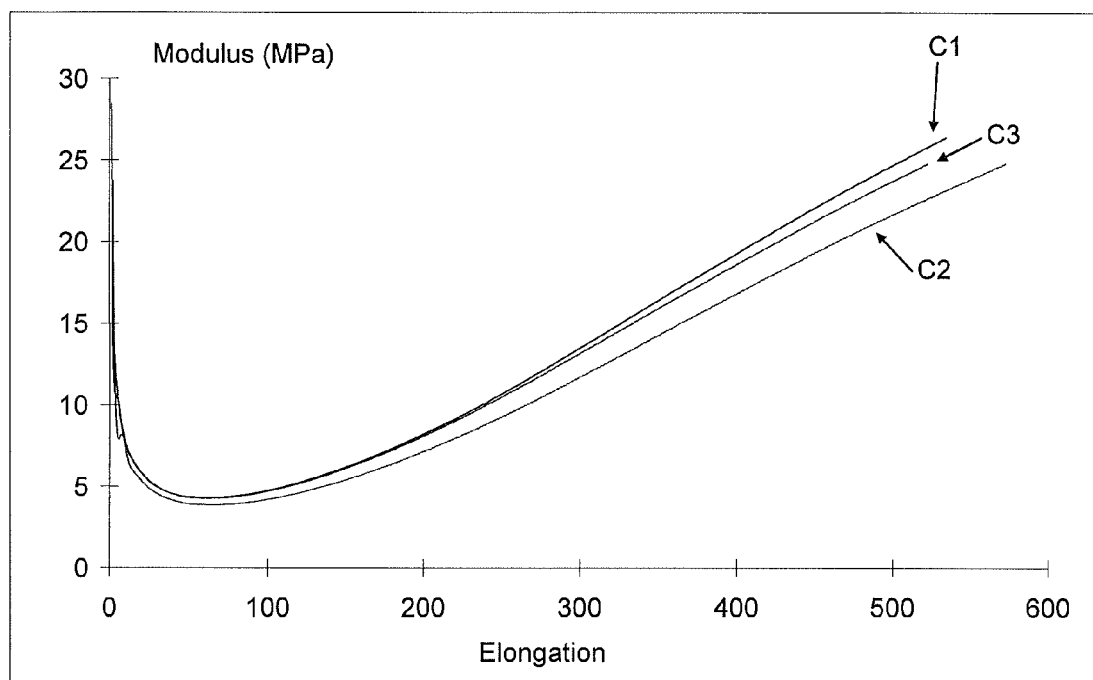

RUBBER TYRE COMPOSITION CONTAINING A DIESTER PLASTICIZER

The present invention relates to rubber compositions intended in particular for the manufacture of tyre treads; it relates more particularly to plasticizing agents and/or systems which can be used for the plasticizing of such compositions.

As is known, a tyre tread has to meet a large number of often conflicting technical requirements, including a low rolling resistance, a high wear resistance and a high grip on both the dry road and the wet road.

This compromise in properties, in particular from the viewpoint of the rolling resistance and the wear resistance, was able to be improved in recent years with regard to energy-saving "Green Tyres", intended in particular for passenger vehicles, by virtue of the use of novel weakly hysteretic rubber compositions having the characteristic of being reinforced predominantly by specific inorganic fillers described as reinforcing, in particular by highly dispersible silicas (IDS), capable of rivaling, from the viewpoint of the reinforcing power, conventional tyre-grade carbon blacks. Thus, today, these reinforcing inorganic fillers are gradually replacing carbon blacks in tyre treads, all the more so as they have another known virtue, that of increasing the grip of tyres on wet, snowy or icy roads.

Enhancing the wear resistance properties, on the one hand, and the wet grip properties, on the other hand, remains, however, a constant preoccupation of designers of tyres, whether the latter comprise treads comprising silica or carbon black as filler.

In order to increase the wear and abrasion resistance of treads, novel plasticizing systems have been provided, for example, which comprise, in combination, non-aromatic oils of the MES or TDAE type with terpene hydrocarbon resins, such as polylimonene, or with $C_5$ fraction/vinylaromatic copolymer or terpene/vinylaromatic copolymer hydrocarbon resins (see Patent Applications WO 2005/087859, WO 2006/061064 and WO 2007/017060).

In order to further improve the grip of the treads on wet, snowy and icy ground, Application WO 2004/022644 has provided, for example, for the use of a glycerol fatty acid triester, in particular a sunflower vegetable oil with a high level of oleic acid, in particular in combination with a plasticizing hydrocarbon resin.

On continuing their research, the Applicant Companies have discovered a specific plasticizing agent, which was hitherto the preserve of other technical fields, which makes it possible to further improve the wet grip of the tyres without adversely affecting their other properties, in particular those of wear resistance and rolling resistance.

Thus, a first subject-matter of the invention is a rubber composition comprising at least a diene elastomer, a reinforcing filler and a 1,2-cyclohexanedicarboxylate diester plasticizer corresponding to the formula (I):

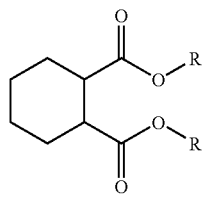

in which the R radicals, which are identical or different, represent a hydrocarbon radical.

Another subject matter of the invention is a process for preparing a rubber composition comprising at least a diene elastomer, a reinforcing filler and an ester plasticizer, the said process comprising the following stages:
incorporating in a diene elastomer, in a mixer:
  a reinforcing filler;
  an ester plasticizer;
  everything being kneaded thermomechanically, in one or more goes, until a maximum temperature of between 110° C. and 190° C. is reached;
cooling the combined mixture to a temperature of less than 100° C.; subsequently incorporating:
  a crosslinking system;
kneading everything up to a maximum temperature of less than 110° C.;
extruding or calendering the rubber composition thus obtained;
and being characterized in that the said ester plasticizer corresponds to the formula (I) above.

Another subject-matter of the invention is the use of a composition according to the invention for the manufacture of a finished article or of a semi-finished product made of rubber intended for any motor vehicle ground-contact system, such as tyre, internal safety support for a tyre, wheel, rubber spring, elastomeric joint, other suspension element and vibration damper.

A particular subject-matter of the invention is the use of a composition according to the invention for the manufacture of tyres or semi-finished products made of rubber intended for these tyres, these semi-finished products being chosen in particular from the group consisting of treads, crown reinforcing plies, sidewalls, carcass reinforcing plies, beads, protectors, underlayers, rubber blocks and other internal rubbers, in particular decoupling rubbers, intended to provide the bonding or the interface between the abovementioned regions of the tyres.

A subject-matter of the invention is more particularly the use of a composition according to the invention in the manufacture of a tyre tread.

Another subject-matter of the invention is the tyres themselves and the semi-finished products, in particular tyre treads, when they comprise a rubber composition in accordance with the invention.

The tyres of the invention are particularly intended to equip motor vehicles, such as passenger vehicles, SUVs (Sport Utility Vehicles), two-wheel vehicles (in particular motor cycles), aeroplanes, such as industrial vehicles chosen from vans, heavy-duty vehicles—that is to say, underground, bus, heavy road transport vehicles (lorries, tractors, trailers) or off-road vehicles, such as heavy agricultural vehicles or earthmoving equipment—, and other transportation or handling vehicles.

The above diester plasticizer of formula is advantageously used in combination with a plasticizing hydrocarbon resin, the invention also relating, per se, to a plasticizing system which can be used for the plasticizing of a diene rubber composition, the said system comprising, in combination, the diester plasticizer of formula (I) and a plasticizing hydrocarbon resin, the Tg of which is greater than 0° C.

The invention also relates to the use of such a system for the plasticizing of a tyre diene rubber composition.

The invention and its advantages will be easily understood in the light of the description and exemplary embodiments which follow and of the single FIGURE relating to these examples, which represents curves of variation in modulus as a function of the elongation for various rubber compositions in or not in accordance with the invention.

I. MEASUREMENTS AND TESTS

The rubber compositions are characterized, before and after curing, as indicated below.

I-1. Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton·meter).

I-2. Rheometry

The measurements are carried out at 150° C. with an oscillating disc rheometer, according to standard DIN 53529—part 3 (June 1983). The change in the rheometric torque as a function of time describes the change in the stiffening of the composition as a result of the vulcanization reaction. The measurements are processed according to standard DIN 53529-part 2 (March 1983): $t_i$ is the induction time, that is to say the time necessary for the start of the vulcanization reaction; $t_\alpha$ (for example $t_{90}$) is the time necessary to achieve a conversion of $\alpha$%, that is to say $\alpha$% (for example 90%) of the difference between the minimum and maximum torques. The conversion rate constant, denoted K (expressed as $min^{-1}$), which is first order, calculated between 30% and 80% conversion, which makes it possible to assess the vulcanization kinetics, is also measured.

I-3. Shore A Hardness

The Shore A hardness of the compositions after curing is assessed in accordance with Standard ASTM D 2240-86.

I-4. Tensile Tests

These tests make it possible to determine the elasticity stresses and the properties at break. Unless otherwise indicated, they are carried out in accordance with French Standard NF T 46-002 of September 1988. The "nominal" secant moduli (or apparent stresses, in MPa) or the "true" secant moduli (reduced in this case to the real cross section of the test specimen) are measured in second elongation (i.e., after a cycle of accommodation) at 10% elongation (denoted "M10" and "E10" respectively), 100% elongation ("M100" and "E100" respectively) and 300% elongation ("M300" and "E300" respectively). All these tensile measurements are carried out under the standard conditions of temperature (23±2° C.) and hygrometry (50±5% relative humidity) according to French Standard NF T 40-101 (December 1979). The breaking stresses (in MPa) and the elongations at break (in %) are also measured, at a temperature of 23° C.

I-5. Dynamic Properties

The dynamic properties are measured on a viscosity analyser (Metravib VA4000) according to Standard ASTM D 5992-96. The response of a sample of vulcanized composition (cylindrical test specimen with a thickness of 4 mm and with a cross section of 400 $mm^2$), subjected to a simple alternating sinusoidal shear stress, at a frequency of 10 Hz, is recorded during a temperature sweep at a fixed stress of 0.7 MPa; the value of tan δ observed at −10° C. (i.e. $tan(\delta)_{-10° C.}$) is recorded. The same sample is also subjected, at a temperature of 40° C., to a strain amplitude sweep from 0.1% to 50% (outward cycle) and then from 50% to 1% (return cycle); the maximum value of the loss factor, denoted $tan(\delta)_{max}$, is recorded for the return cycle.

It should be remembered that, in a way well known to a person skilled in the art, the value of $tan(\delta)_{max}$ (according to a "strain" sweep, at a given temperature) is representative of the hysteresis and of the rolling resistance (the smaller $tan(\delta)_{max}$, the lower the hysteresis and thus the rolling resistance), while the value of $tan(\delta)_{-10° C.}$ (according to a "temperature" sweep, at a given strain) is representative of the wet grip potential (the higher $tan(\delta)_{-10° C.}$, the better the grip).

II. DETAILED DESCRIPTION OF THE INVENTION

The rubber composition according to the invention, which can be used in particular for the manufacture of a tyre or of a tyre tread, comprises at least a diene elastomer, a reinforcing filler and a specific plasticizing system.

In the present description, unless expressly indicated otherwise, all the percentages (%) shown are % by weight. Moreover, any interval of values denoted by the expression "between a and b" represents the range of values extending from greater than a to less than b (i.e., limits a and b excluded), whereas any interval of values denoted by the expression "from a to b" means the range of values extending from a up to b (i.e., including the strict limits a and b).

II-1. Diene Elastomer

The term "diene" elastomer or rubber should be understood as meaning, in a known way, an (one or more are understood) elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used in the compositions in accordance with the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in FR 2 740 778 or U.S. Pat. No. 6,013,718), of alkoxysilane groups (such as described, for example, in FR 2 765 882 or U.S. Pat. No. 5,977,238), of carboxyl groups (such as described, for example, in WO 01/92402 or U.S. Pat. No. 6,815,473, WO 2004/096865 or US 2006/0089445) or of polyether groups (such as described, for example, in EP 1 127 909 or U.S. Pat. No. 6,503,973).

The following are suitable: polybutadienes, in particular those having a content (molar %) of 1,2-units of between 4% and 80% or those having a content (molar %) of cis-1,4-units of greater than 80%, polyisoprenes, butadiene/styrene copolymers and in particular those having a Tg (glass transition temperature, measured according to Standard ASTM D3418) of between 0° C. and −70° C. and more particularly between −10° C. and −60° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2- plus 3,4-units of the isoprene part of between 5% and 70% and a content (molar %) of trans-1,4-units of the isoprene part of between 10% and 50%, and more generally any butadiene/styrene/isoprene copolymer having a Tg of between −20° C. and −70° C., are suitable in particular.

To sum up, the diene elastomer of the composition in accordance with the invention is preferably chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

According to a specific embodiment, the diene elastomer is predominantly (i.e., for more than 50 pce) an SBR, whether an SBR prepared in emulsion ("ESBR") or an SBR prepared in solution ("SSBR"), or an SBR/BR, SBR/NR (or SBR/IR), BR/NR (or BR/R) or also SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

According to another specific embodiment, the diene elastomer is predominantly (for more than 50 pce) an isoprene elastomer. This is the case in particular when the compositions of the invention are intended to constitute, in the tyres, rubber matrices of certain treads (for example for industrial vehicles), of crown reinforcing plies (for example of working plies, protection plies or hooping plies), of carcass reinforcing plies, of sidewalls, of beads, of protectors, of underlayers, of rubber blocks and other internal rubbers providing the interface between the abovementioned regions of the tyres.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to another specific embodiment, in particular when it is intended for a tyre sidewall or for an airtight internal rubber of a tubeless tyre (or other air-impermeable component), the composition in accordance with the invention can comprise at least one essentially saturated diene elastomer, in particular at least one EPDM copolymer or one butyl rubber (optionally chlorinated or brominated), whether these copolymers are used alone or as a blend with highly unsaturated diene elastomers as mentioned above, in particular NR or IR, BR or SBR.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer exhibiting a Tg of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRs, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

According to another specific embodiment of the invention, the rubber composition comprises, for example, from 30 to 100 pce, in particular from 50 to 100 pce, of a high Tg elastomer as a blend with 0 to 70 pce, in particular from 0 to 50 pee, of a low Tg elastomer; according to another example, it comprises, for the whole of the 100 pce, one or more SBR(s) prepared in solution.

According to another specific embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomer(s)).

The compositions of the invention can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

II-2. Reinforcing Filler

Use may be made of any type of reinforcing filler known for its capabilities of reinforcing a rubber composition which can be used for the manufacture of tyres, for example an organic filler, such as carbon black, a reinforcing inorganic filler, such as silica, or a blend of these two types of filler, in particular a blend of carbon black and silica.

All carbon blacks, in particular blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of the functionalized polyvinylaromatic organic fillers as described in Applications WO 2006/069792 and WO 2006/069793.

The term "reinforcing inorganic filler" should be understood, in the present patent application, by definition, as meaning any inorganic or mineral filler, whatever its colour and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible ("HDS") precipitated silicas, for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface as described in Application WO 03/16837.

When the compositions of the invention are intended for tyre treads having a low rolling resistance, the reinforcing inorganic filler used, in particular if it is silica, preferably has a BET surface of between 45 and 400 $m^2/g$, more preferably of between 60 and 300 $m^2/g$.

Preferably, the level of total reinforcing filler (carbon black and/or reinforcing inorganic filler, such as silica) is between 20 and 200 pce, more preferably between 30 and 150 pce, the optimum being in a known way different depending on the specific applications targeted: the level of reinforcement expected with regard to a bicycle tyre, for example, is, of course, less than that required with regard to a tyre capable of running at high speed in a sustained manner, for example a motor cycle tyre, a tyre for a passenger vehicle or a tyre for a utility vehicle, such as a heavy duty vehicle.

According to a preferred embodiment of the invention, use is made of a reinforcing filler comprising between 30 and 150 pce, more preferably between 50 and 120 pce, of inorganic filler, particularly silica, and optionally carbon black; the carbon black, when it is present, is preferably used at a level of less than 20 pce, more preferably of less than 10 pce (for example between 0.1 and 10 pce).

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, as described, for example, in Applications WO 03/002648 (or US 2005/016651) and WO 03/002649 (or US 2005/016650).

"Symmetrical" silane polysulphides corresponding to the following general formula (III):

Z-A-$S_x$-A-Z, in which: (III)

x is an integer from 2 to 8 (preferably from 2 to 5);

A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

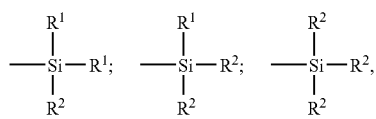

in which:
- the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
- the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl), are suitable in particular, without the above definition being limiting.

In the case of a mixture of alkoxysilane polysulphides corresponding to the above formula (III), in particular the usual mixtures available commercially, the mean value of the "x" index is a fractional number preferably of between 2 and 5, more preferably in the vicinity of 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in Patent Application WO 02/083782 (or US 2004/132880).

Mention will in particular be made, as coupling agent other than alkoxysilane polysulphide, of bifunctional POSs (polyorganosiloxanes) or of hydroxysilane polysulphides ($R^2$=OH in the above formula III), such as described in Patent Applications WO 02/30939 (or U.S. Pat. No. 6,774,255) and WO 02/31041 (or US 2004/051210), or of silanes or POSs carrying azodicarbonyl functional groups, such as described, for example, in Patent Applications WO 2006/125532, WO 2006/125533 and WO 2006/125534.

In the rubber compositions in accordance with the invention, the content of coupling agent is preferably between 4 and 12 pce, more preferably between 3 and 8 pce.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

II-3. 1,2-Cyclohexanedicarboxylate Diester Plasticizer

The rubber composition of the invention has the essential characteristic of incorporating a 1,2-cyclohexanedicarboxylate diester plasticizer corresponding to the formula (I):

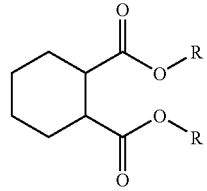

in which the R radicals, which are identical or different, represent a hydrocarbon radical preferably chosen from the group consisting of linear, branched or cyclic alkyls comprising from 1 to 30 carbon atoms and aryls, aralkyls or alkaryls comprising from 6 to 30 carbon atoms, it being possible for this hydrocarbon radical to comprise a heteroatom chosen in particular from S, O and N.

More preferably, in the above formula (I), the R radicals represent a linear, branched or cyclic alkyl group comprising from 1 to 20, in particular from 1 to 15, carbon atoms.

Mention may be made, as examples of such preferred R radicals comprising from 1 to 15 carbon atoms, which are identical or different, in the above formula (I), for example, of the methyl, ethyl, butoxyethyl, ethoxyethyl, propyl, propenyl, butyl, isobutyl, heptyl, isoheptyl, hexyl, cyclohexyl, ethylhexyl, benzyl, octyl, isooctyl, nonyl, isononyl, isodecyl, tridecyl, dodecyl, isotridecyl or undecyl radicals.

Use is preferably made of a diester, the R radicals of which, which are identical or different, comprise from 8 to 11 carbon atoms, in particular 9 or 10 carbon atoms.

Use is made in particular of diisononyl 1,2-cyclohexanedicarboxylate, of formula (II):

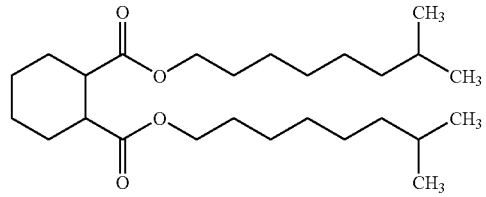 [SMILES: CC(C)CCCCCCOC(=O)C1CCCCC1C(=O)OCCCCCCC(C)C]

Such a compound is known and commercially available; it was developed for the plasticizing of rigid plastics, such as PVC, for applications such as food packaging, medical equipment or the manufacture of toys. It is sold by BASF under the name "Hexamoll DINCH".

In the rubber composition of the invention, the level of diester plasticizer of formula (I) or (II) is preferably between 5 and 60 pce. Below the minimum indicated, the targeted technical effects may prove to be inadequate while, above 60 pce, the possibility exists of a reduction in grip of the tyres when the compositions of the invention are used in the treads of these tyres. For these reasons, the level of diester is more preferably between 5 and 40 pce, more preferably still between 10 and 30 pce.

The diester plasticizers described above are liquid at ambient temperature (23° C.). They exhibit a Tg typically of less than −60° C. Therefore, according to a specific embodiment of the invention, they could be used, in all or part, as extending oil for the diene elastomers present in the rubber composition of the invention.

According to a particularly preferred embodiment of the invention, the preceding diester plasticizer is combined with, as second plasticizer, a plasticizing hydrocarbon resin, the Tg of which is greater than 0° C.

In a way known to a person skilled in the art, the name "plasticizing resin" is reserved in the present patent application, by definition, for a compound which is, on the one hand, solid at ambient temperature (23° C.) (in contrast to the liquid plasticizing compound, such as an oil) and, on the other hand, compatible (that is to say, miscible at the level used, typically of greater than 5 pce) with the rubber composition for which it is intended, so as to act as a true diluting agent.

Hydrocarbon resins are polymers well known to a person skilled in the art which are miscible by nature in diene elastomer composition(s), when they are additionally described as being "plasticizing". They have been described, for example, in the work entitled *Hydrocarbon Resins* by R. Mildenberg, M. Zander and G. Collin (New York, VCH, 1997, ISBN 3-527-28617-9), chapter 5 of which is devoted to their applications, in particular in the tyre rubber field (5.5. *"Rubber Tires and Mechanical Goods"*). They can be aliphatic or aromatic or also of the aliphatic/aromatic type, that is to say based on aliphatic and/or aromatic monomers. They can be natural or synthetic and may or may not be oil-based (if such is the case, also known under the name of petroleum resins). They are preferably exclusively hydrocarbon, that is to say that they comprise only carbon and hydrogen atoms.

Preferably, the plasticizing hydrocarbon resin exhibits at least any one of the following characteristics:

- a Tg of greater than 20° C., more preferably of greater than 30° C.;
- a number-average molecular weight (Mn) of between 400 and 2000 g/mol, more preferably of between 500 and 1500 g/mol;
- a polydispersity index (PI) of less than 3, more preferably of less than 2 (reminder: PI=Mw/Mn with Mw the weight-average molecular weight).

More preferably, this plasticizing hydrocarbon resin exhibits all of the preferred characteristics above.

The glass transition temperature Tg is measured in a known way by DSC (Differential Scanning Calorimetry) according to Standard ASTM D3418 (1999). The macrostructure (Mw, Mn and PI) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

According to a particularly preferred embodiment, the plasticizing hydrocarbon resin is chosen from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins.

Use is preferably made, among the above copolymer resins, of those chosen from the group consisting of (D)CPD/vinylaromatic copolymer resins, (D)CPD/terpene copolymer resins, (D)CPD/$C_5$ fraction copolymer resins, terpene/vinylaromatic copolymer resins, $C_5$ fraction/vinylaromatic copolymer resins and the mixtures of these resins.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers.

Styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a more particularly preferred embodiment, the plasticizing hydrocarbon resin is chosen from the group consisting of (D)CPD homopolymer resins, (D)CPD/styrene copolymer resins, polylimonene resins, limonene/styrene copolymer resins, limonene/(D)CPD copolymer resins, $C_5$ fraction/styrene copolymer resins, $C_5$ fraction/$C_9$ fraction copolymer resins and the mixtures of these resins.

The preferred resins above are well known to a person skilled in the art and are commercially available, for example sold, as regards the:

- polylimonene resins: by DRT under the name "Dercolyte L120" (Mn=625 g/mol; Mw=1010 g/mol; PI=1.6; Tg=72° C.) or by Arizona Chemical Company under the name "Sylvagum TR7125C" (Mn=630 g/mol; Mw=950 g/mol; PI=1.5; Tg=70° C.);
- $C_5$ fraction/vinylaromatic, in particular $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373";
- limonene/styrene copolymer resins: by DRT under the name "Dercolyte TS 105" or by Arizona Chemical Company under the names "ZT115LT" and "ZT5100".

The level of hydrocarbon resin is preferably between 5 and 60 pce. Below the minimum indicated, the targeted technical effect may prove to be inadequate while, above 60 pce, the tackiness of the compositions in the raw state, with regard to the mixing devices, can in some cases become totally unacceptable from the industrial viewpoint. For these reasons, the level of hydrocarbon resin is more preferably between 5 and 40 pce, more preferably still between 10 and 30 pce.

With regard to the overall level of plasticizing system according to the invention, comprising in combination the diester plasticizer and the hydrocarbon resin, it is preferably between 10 and 100 pce, more preferably between 20 and 80 pce (in particular between 20 and 50 pce).

II-4. Various Additives

The rubber compositions in accordance with the invention can also comprise all or a portion of the usual additives generally used in elastomer compositions intended for the manufacture of tyres or semi-finished products for tyres, such as, for example, other plasticizing agents, preferably non-aromatic or very slightly aromatic plasticizing agents, for example naphthenic or paraffinic oils, MES or TDAE oils, glycerol esters (in particular trioleates), especially natural esters, such as rapeseed or sunflower vegetable oils, pigments, protection agents, such as antiozone waxes, chemical antiozonants, antioxidants, antifatigue agents, reinforcing resins, methylene acceptors (for example, phenolic novolak resin) or methylene donors (for example, HMT or H3M), a crosslinking system based either on sulphur or on sulphur donors and/or on peroxide and/or on bismaleimides, vulcanization accelerators, vulcanization activators or antireversion agents.

These compositions can also comprise, in addition to coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their ability to be processed in the raw state, these agents being, for example, hydrolysable silanes, such as alkylalkoxysilanes, polyols, polyethers, primary, secondary or tertiary amines or hydroxylated or hydrolysable polyorganosiloxanes.

II-5. Manufacture of the Rubber Compositions

The compositions are manufactured in appropriate mixers using two successive preparation phases well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) up to a lower temperature, typically of less than 110° C., for example between 40° C. and 100° C., finishing phase during which the crosslinking system is incorporated.

The process in accordance with the invention for preparing a rubber composition exhibiting in particular an improved wet grip comprises the following stages:

incorporating in a diene elastomer, during a first stage ("non-productive" stage), at least one reinforcing filler and one ester plasticizer, everything being kneaded thermomechanically, in one or more goes, until a maximum temperature of between 110° C. and 190° C. is reached;

cooling the combined mixture to a temperature of less than 100° C.;

subsequently incorporating, during a second stage ("productive" stage), a crosslinking system;

kneading everything up to a maximum temperature of less than 110° C., and it is characterized in that the said ester plasticizer corresponds to the above-mentioned formula (I) and, preferably, to the abovementioned preferred characteristics.

By way of example, the non-productive phase is carried out in a single thermomechanical stage during which, in a first step, all the necessary base constituents (diene elastomer, reinforcing filler and coupling agent, if necessary, plasticizer) are introduced, in one or more goes, into an appropriate mixer, such as a normal internal mixer, followed, in a second step, for example after kneading for one to two minutes, by the other additives, optional additional covering agents or processing aids, with the exception of the crosslinking system. After cooling the mixture thus obtained, the crosslinking system is then incorporated in an external mixer, such as an open mill, maintained at a low temperature (for example, between 40° C. and 100° C.). The combined mixture is then mixed (productive phase) for a few minutes, for example between 2 and 15 min.

The crosslinking system is preferably a vulcanization system based on sulphur and on an accelerator. Use may be made of any compound capable of acting as accelerator of the vulcanization of diene elastomers in the presence of sulphur, in particular those chosen from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-tert-butyl-2-benzothiazole-sulphenamide (abbreviated to "TBBS"), N-tert-butyl-2-benzothiazolesulphenimide (abbreviated to "TBSI") and the mixtures of these compounds. Preferably, a primary accelerator of the sulphenamide type is used.

Additional to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. When using the composition of the invention as a tyre tread, the level of sulphur is, for example, between 0.5 and 3.0 pce and that of the primary accelerator is between 0.5 and 5.0 pce.

The final composition thus obtained is subsequently calendered, for example in the form of a sheet or of a plaque, in particular for laboratory characterization, or else is extruded in the than of a rubber profiled element which can be used, for example, as a tyre tread for a passenger vehicle.

The vulcanization (or curing) is carried out in a known way at a temperature generally of between 130° C. and 200° C. for a sufficient time which can vary, for example, between 5 and 90 min depending in particular on the curing temperature, the vulcanization system adopted and the vulcanization kinetics of the composition under consideration.

The invention relates to the rubber compositions described above both in the "raw" state (i.e., before curing) and in the "cured" or vulcanized state (i.e., after vulcanization).

III. EXAMPLES OF THE IMPLEMENTATION OF THE INVENTION

III-1. Preparation of the Rubber Compositions

The tests which follow are carried out in the following way: the reinforcing filler, the coupling agent, the plasticizing system, the diene elastomer and the various other ingredients, with the exception of the vulcanization system, are successively introduced into a laboratory internal mixer, 70% filled and having an initial vessel temperature of approximately 60° C. Thermomechanical working (non-productive phase) is then carried out in one stage, which lasts in total approximately from 3 to 4 minutes, until a maximum "dropping" temperature of 165° C. is reached. The mixture thus obtained is recovered and cooled and then sulphur and an accelerator of sulphenamide type are incorporated on an external mixer (homofinisher) at 30° C., the combined mixture being mixed (productive phase) for an appropriate time (for example, between 5 and 12 min).

The compositions thus obtained are subsequently calendered, either in the form of plaques (thickness of 2 to 3 mm) or of fine sheets of rubber, for the measurement of their physical or mechanical properties, or extruded in the form of treads for passenger vehicle tyres.

III-2. Rubber Tests

The aim of this test is to demonstrate the improved performance of a rubber composition according to the invention, in comparison with two control compositions of the prior art. For this, three compositions based on diene elastomers (SSBR and BR blends) reinforced with silica and carbon black are prepared, the formulation of which is suited to the manufacture of tyre treads.

The three compositions tested are identical, except for the nature of one of their components (first plasticizer, liquid):

composition C-1: MES oil;
composition C-2: sunflower oil;
composition C-3: 1,2-cyclohexanedicarboxylate diester.

Use is made, as second plasticizer (solid), of a plasticizing hydrocarbon resin (polylimonene) in each of the three compositions. Compositions C-1 and C-2 are reference compositions for the Applicant Companies which have furthermore given proof of their excellent performance in terms of wear or abrasion resistance, on the one hand (composition C-1), and of wet grip, on the other hand (composition C-2).

The MES (for "Medium Extracted Solvates") oil is an oil of the "non-aromatic" type which is characterized by a very low level of polyaromatics (approximately 20 to 50 times less), in comparison with conventional petroleum-derived aromatic oils which comprise a high level of aromatics, known under the name of DAE (for "Distillate Aromatic Extracts") oils, such as described, for example, in Applications WO 2005/087859 and WO 2006/061064. The sunflower vegetable oil is an "oleic" sunflower oil, that is to say comprising a very high level of oleic acid (at least 85% by weight of the total of the fatty acids), such as recommended by the abovementioned application WO 2004/022644.

Only composition C-3 is thus in accordance with the invention.

Tables 1 and 2 give the make-up of the two compositions (Table 1—level of the various products expressed in "pce" or parts by weight per one hundred parts of elastomer(s)) and their properties before and after curing (30 min at 150° C.); the vulcanization system is composed of sulphur and sulphenamide. The appended FIGURE reproduces the curves of true secant modulus (in MPa) as a function of elongation (in %); these curves are denoted C1 to C3 and correspond respectively to compositions C-1 to C-3.

On reading Table 2, it is noticed that composition C-3 in accordance with the invention, compared with the control composition C-1, exhibits:

- an improved processability (Mooney viscosity very substantially reduced);
- equivalent rheometric properties;
- tensile properties, in particular moduli under strong strains (M100 and M300), which are also equivalent, which demonstrates a very high level of reinforcing for the composition of the invention, evidence of a wear resistance comparable to that of the reference composition C-1;
- this is confirmed by the tensile curves reproduced in the appended FIGURE: it is seen that curve C3 is very similar to curve C1, this being the case up to the highest strains;
- finally, which is not the least, substantially improved dynamic properties with, on the one hand, a $\tan(\delta)_{max}$ value (at 40° C.) which is slightly lower, synonymous with a hysteresis and thus with a rolling resistance which is at least the same, if not reduced, and, on the other hand and in particular, a $\tan(\delta)$ value at −10° C. which is markedly higher, a recognized indicator of an improved wet grip.

Furthermore, compared with control composition C-2, composition C-3 of the invention demonstrates dynamic properties which are at least equivalent, if not improved, as regards the grip (slightly increased value of $\tan(\delta)$ at −10° C.), with in particular greater reinforcing properties, illustrated both by the higher values of moduli under strong strains (M100 and M300) and by the positioning of the tensile curves (curve C2 markedly lower than curve C3, in comparison with curve C1).

In conclusion, the invention thus makes it possible to improve the wet grip of the treads in accordance with the invention, without adversely affecting the other properties, in particular those of wear resistance and rolling resistance.

TABLE 1

| | Composition No: | | |
|---|---|---|---|
| | C-1 | C-2 | C-3 |
| SBR (1) | 70 | 70 | 70 |
| BR (2) | 30 | 30 | 30 |
| Silica (3) | 80 | 80 | 80 |
| Coupling agent (4) | 6.4 | 6.4 | 6.4 |
| Carbon black (5) | 6 | 6 | 6 |
| Plasticizing agent (6) | 15 | — | — |
| Plasticizing agent (7) | — | 15 | — |
| Plasticizing agent (8) | — | — | 15 |
| Resin (9) | 15 | 15 | 15 |
| DPG (10) | 1.5 | 1.5 | 1.5 |
| ZnO | 2.5 | 2.5 | 2.5 |
| Stearic acid | 2 | 2 | 2 |
| Antiozone wax | 1.5 | 1.5 | 1.5 |
| Antioxidant (11) | 1.9 | 1.9 | 1.9 |
| Sulphur | 1.1 | 1.1 | 1.1 |
| Accelerator (12) | 2.0 | 2.0 | 2.0 |

(1) SSBR with 25% of styrene, 64% of 1,2-polybutadiene units and 25% of trans-1,4-polybutadiene units (Tg = −18° C.);
(2) BR with 4.3% of 1,2-; 2.7% of trans-1,4-; 93% of cis-1,4-(Tg = −106° C.);
(3) Silica "Zeosil 1165MP" from Rhodia, "HDS" type (BET and CTAB: approximately 160 m²/g);
(4) Coupling agent TESPT ("Si69" from Degussa);
(5) Carbon black N234 (ASTM grade);
(6) MES oil ("Catenex SNR" from Shell);
(7) Glycerol trioleate (sunflower oil comprising 85% by weight of oleic acid - "Lubrirob Tod 1880" from Novance);
(8) Diisononyl 1,2-cyclohexanedicarboxylate ("Hexamoll DINCH" from BASF);
(9) Polylimonene resin ("Dercolyte L120" from DRT);
(10) Diphenylguanidine (Perkacit DPG from Flexsys);
(11) N-(1,3-Dimethylbutyl)-N-phenyl-para-phenylenediamine (Santoflex 6-PPD from Flexsys);
(12) CBS (Santocure from Flexsys).

TABLE 2

| | Composition No.: | | |
|---|---|---|---|
| | C-1 | C-2 | C-3 |
| Properties before curing: | | | |
| Mooney (MU) | 102 | 80 | 79 |
| $t_i$ (min) | 6.9 | 5.2 | 5.4 |
| $t_{90}$ (min) | 32.6 | 37.7 | 34.5 |
| $t_{90}$-$t_i$ (min) | 40.4 | 47.4 | 43.2 |
| K (min$^{-1}$) | 0.089 | 0.071 | 0.079 |
| Properties after curing: | | | |
| Shore A hardness | 69 | 67 | 69 |
| M10 (MPa) | 6.5 | 5.8 | 6.3 |
| M100 (MPa) | 2.1 | 1.8 | 2.1 |
| M300 (MPa) | 2.4 | 2.1 | 2.4 |
| Breaking stress (MPa) | 22.3 | 20.9 | 20.9 |
| Elongation at break (%) | 537 | 567 | 524 |
| $\tan(\delta)_{max}$ (40° C.) | 0.299 | 0.280 | 0.285 |
| $\tan(\delta)_{-10° C.}$ (0.7 MPa) | 0.77 | 0.83 | 0.85 |

The invention claimed is:

1. A tire tread comprising a rubber composition comprising:

at least one diene elastomer selected from the group consisting of polybutadienes, synthetic polyisoprenes, natural rubber, butadiene copolymers, isoprene copolymers and the mixtures of these elastomers, a reinforcing filler, and a 1,2-cyclohexanedicarboxylate diester plasticizer corresponding to the formula (I):

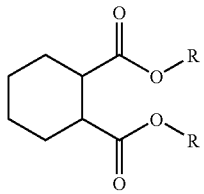

wherein the R radicals, which are identical or different, represent a hydrocarbon radical.

2. The tire tread according to claim 1, wherein the R radicals, which are identical or different, are chosen from the group consisting of linear, branched or cyclic alkyls comprising from 1 to 30 carbon atoms and aryls, aralkyls or alkaryls comprising from 6 to 30 carbon atoms.

3. The tire tread according to claim 2, wherein the R radicals represent a linear, branched or cyclic alkyl group comprising from 1 to 20 carbon atoms.

4. The tire tread according to claim 3, wherein the R radicals comprise from 8 to 11 carbon atoms.

5. The tire tread according to claim 4, wherein the diester plasticizer is a diisononyl 1,2-cyclohexanedicarboxylate, of formula (II):

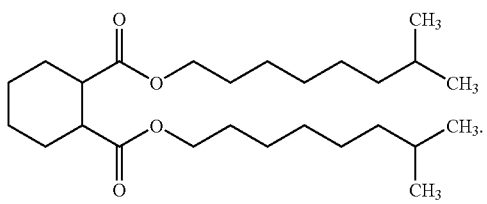 [SMILES: CC(C)CCCCCCOC(=O)C1CCCCC1C(=O)OCCCCCCC(C)C]

6. The tire tread according to claim 1, wherein the level of diester plasticizer is between 5 and 60 pce.

7. The tire tread according to claim 6, wherein the level of diester plasticizer is between 5 and 40 pce.

8. The tire tread according to claim 1, further comprising a plasticizing hydrocarbon resin having a glass transition temperature greater than 0° C.

9. The tire tread according to claim 8, wherein the plasticizing hydrocarbon resin has a Tg of greater than +20° C.

10. The tire tread according to claim 8, wherein the number-average molecular weight of the hydrocarbon resin is between 400 and 2000 g/mol.

11. The tire tread according to claim 8, wherein the polydispersity index of the hydrocarbon carbon is less than 3.

12. The tire tread according to claim 8, wherein the plasticizing hydrocarbon resin is chosen from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins.

13. The tire tread according to claim 12, wherein the plasticizing hydrocarbon resin is chosen from the group consisting of (D)CPD homopolymer resins, (D)CPD/styrene copolymer resins, polylimonene resins, limonene/styrene copolymer resins, limonene/(D)CPD copolymer resins, $C_5$ fraction/styrene copolymer resins, $C_5$ fraction/$C_9$ fraction copolymer resins and the mixtures of these resins.

14. The tire tread according to claim 8, wherein the level of plasticizing hydrocarbon resin is between 5 and 60 pce.

15. The tire tread according to claim 1, wherein the reinforcing filler comprises carbon black.

16. The tire tread according to claim 1, wherein the reinforcing filler comprises silica.

17. A tire comprising a rubber composition comprising:
at least one diene elastomer selected from the group consisting of polybutadienes, synthetic polyisoprenes, natural rubber, butadiene copolymers, isoprene copolymers and the mixtures of these elastomers,
a reinforcing filler, and
a 1,2-cyclohexanedicarboxylate diester plasticizer corresponding to the formula (I):

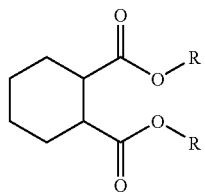

wherein the R radicals, which are identical or different, represent a hydrocarbon radical.

18. The tire according to claim 17, wherein the R radicals, which are identical or different, are chosen from the group consisting of linear, branched or cyclic alkyls comprising from 1 to 30 carbon atoms and aryls, aralkyls or alkaryls comprising from 6 to 30 carbon atoms.

19. The tire according to claim 18, wherein the R radicals represent a linear, branched or cyclic alkyl group comprising from 1 to 20 carbon atoms.

20. The tire according to claim 19, wherein the R radicals comprise from 8 to 11 carbon atoms.

21. The tire according to claim 20, wherein the diester plasticizer is a diisononyl 1,2-cyclohexanedicarboxylate, of formula (II):

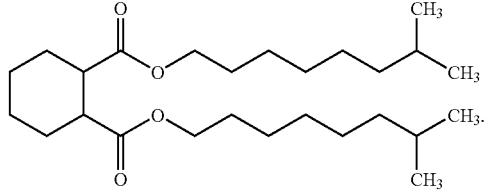 [SMILES: CC(C)CCCCCCOC(=O)C1CCCCC1C(=O)OCCCCCCC(C)C]

22. The tire according to claim 17, wherein the level of diester plasticizer is between 5 and 60 pce.

23. The tire according to claim 22, wherein the level of diester plasticizer is between 5 and 40 pce.

24. The tire according to claim 17, further comprising a plasticizing hydrocarbon resin having a glass transition temperature greater than 0° C.

25. The tire according to claim 24, wherein the plasticizing hydrocarbon resin has a Tg of greater than +20° C.

26. The tire according to claim 24, wherein the number-average molecular weight of the hydrocarbon resin is between 400 and 2000 g/mol.

27. The tire according to claim 24, wherein the polydispersity index of the hydrocarbon carbon is less than 3.

28. The tire according to claim 24, wherein the plasticizing hydrocarbon resin is chosen from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins.

29. The tire according to claim 28, wherein the plasticizing hydrocarbon resin is chosen from the group consisting of (D)CPD homopolymer resins, (D)CPD/styrene copolymer resins, polylimonene resins, limonene/styrene copolymer resins, limonene/(D)CPD copolymer resins, $C_5$ fraction/styrene copolymer resins, $C_5$ fraction/$C_9$ fraction copolymer resins and the mixtures of these resins.

30. The tire according to claim 24, wherein the level of plasticizing hydrocarbon resin is between 5 and 60 pce.

31. The tire according to claim 17, wherein the reinforcing filler comprises carbon black.

32. The tire tread according to claim 17, wherein the reinforcing filler comprises silica.

\* \* \* \* \*